D. R. SMITH.
ICE CREAM CONE CARRIER.
APPLICATION FILED AUG. 31, 1914.
1,140,540.
Patented May 25, 1915.
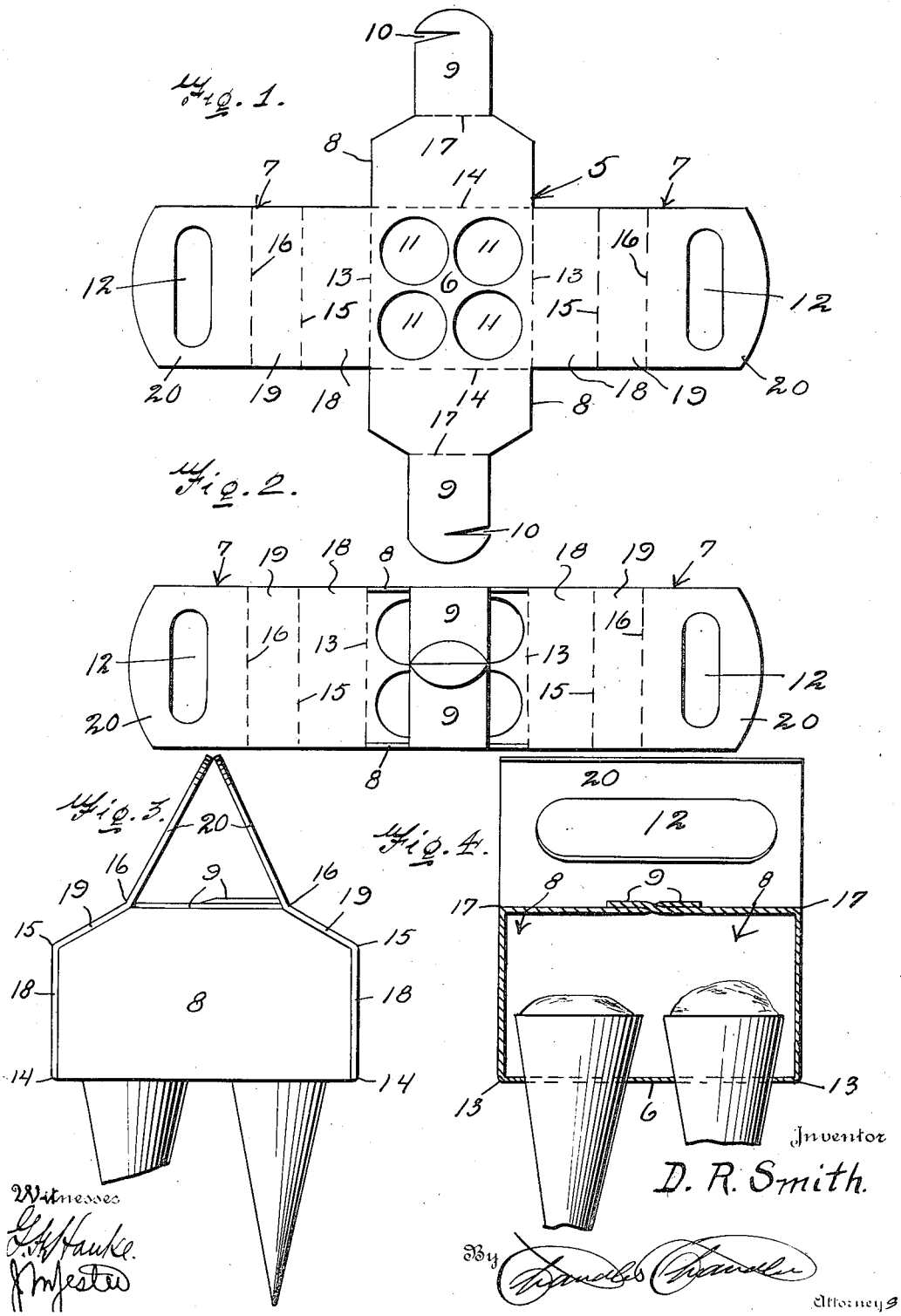

UNITED STATES PATENT OFFICE.

DELL R. SMITH, OF BLANCHARD, WASHINGTON.

ICE-CREAM-CONE CARRIER.

1,140,540.  Specification of Letters Patent.  Patented May 25, 1915.

Application filed August 31, 1914. Serial No. 859,531.

*To all whom it may concern:*

Be it known that I, DELL R. SMITH, a citizen of the United States, residing at Blanchard, in the county of Skagit, State of Washington, have invented certain new and useful Improvements in Ice-Cream-Cone Carriers; and I do hereby declare the following to be a full, clear, and exact description of the invention, such as will enable others skilled in the art to which it appertains to make and use the same.

This invention relates to carrying devices, particularly to that type formed of paper or cardboard and has for its object the provision of a simple and novel device whereby a plurality of ice cream cones may be conveniently carried.

An important object is the provision of a device of this character so formed that the tops of the cones will be covered, thereby preventing melting of the ice cream and preventing dust from settling on it.

A further object is the provision of a device of this character which will be simple and inexpensive in manufacture, efficient in service, and a general improvement of the art.

With these and other objects and advantages in view, my invention consists in the novel construction and arrangement of parts to be hereinafter more fully described and claimed, and illustrated in the accompanying drawing, in which—

Figure 1 is a view of the blank from which my device is formed, the bends being indicated by dotted lines, Fig. 2 is a plan view of my device partly folded, Fig. 3 is a side elevation completely folded, and Fig. 4 is a cross sectional view.

Referring more particularly to the drawing the numeral 5 designates a sheet of material, preferably cardboard which is cut as shown to provide a central portion 6, side portions 7 and end portions 8. The end portions 8 have formed thereon tabs 9 engaged as shown at 10 for a purpose to be described. The central portion 6 is provided with a plurality of openings 11 adapted to receive ice cream cones and the ends of the sides 7 are provided with holes 12 for a purpose to be described.

The sheet of material 5 is scored along the lines 13 and 14 to define the edges of the central portion 6 which is to form the bottom of the completed article. The sides 7 are scored upon the lines 15 and 16, and the ends are scored along the lines 17 which are at the junction of the ends 8 and tabs 9.

My device being flat as shown in Fig. 1, when it is desired to assemble it for use, the ends 8 are bent upwardly upon the lines 14 and are disposed vertically in relation to the portion 6. The tabs 9 are then bent over toward each other upon the lines 17 and the notches 10 are engaged with each other. When this is done, the device will have the appearance shown in Fig. 2 and the ends 8 will be held firmly in a vertical position. The sides 7 are then bent upwardly upon the lines 13, which bending distinctly defines the central portion 6 as the bottom of the device. The sides 7 are then bent again upon the lines 15, thus providing vertically extending portions 18 which together with the ends 8 form the peripheral closure of the device. The sides 7 are then bent backwardly upon the lines 16, and are then brought together as shown in Fig. 3 thus forming inclined portions 19 disposed over the upper edges of the ends 8, and the vertical portions 20 serving as a handle, by virtue of the finger engaging holes 12 formed therein. Before the tabs 9 are connected, the ice cream cones to be carried are inserted through the holes 11 and will be held firmly therein. After the device is thus completely assembled as previously described it will be seen that the top of the cones will be covered, thereby excluding dust and protecting the ice cream from heat. It may be found convenient to employ any suitable stand or support for holding the device elevated while the cones are being inserted through the holes 11.

It will be readily observed that a large number of my carriers may be packed in an extremely small space before they are folded and will therefore be convenient in storage and transportation.

Although I have shown my device as formed of a specific shape and provided with only four holes for the reception of cones, it will be readily understood that I may adapt it for carrying any suitable number of cones and that I may make such desired changes in the shape as will not depart from the spirit of the invention or limit the scope of the subjoined claim.

Having thus described my invention, I claim:

An ice cream cone device formed integral and comprising a bottom having a plurality of openings formed therein for the reception of ice cream cones, end members extending vertically from the bottom and provided with mutually engageable and bendable tabs, sides extending vertically from the bottom, converging portions extending from the tops of the sides and part-way over the bottom, said end portions having inclined upper edge portions upon which said converging portions lie, and bendable hand-holding edges on said converging portions.

In testimony whereof, I affix my signature, in the presence of two witnesses.

DELL R. SMITH.

Witnesses:
  PERCY LINSEY,
  G. A. WRIGHT.